United States Patent [19]

Barry

[11] Patent Number: 4,604,517

[45] Date of Patent: Aug. 5, 1986

[54] PULSE FREQUENCY MODULATION CONTROL FOR A HEATER

[75] Inventor: Michael N. Barry, Cork, Ireland

[73] Assignee: Westinghouse Electric Corp., Pittsburgh, Pa.

[21] Appl. No.: 736,406

[22] Filed: May 20, 1985

Related U.S. Application Data

[63] Continuation of Ser. No. 521,206, Aug. 8, 1983, abandoned.

[51] Int. Cl.[4] .............................................. H05B 1/02
[52] U.S. Cl. .................................. 219/494; 219/501; 219/497; 323/235
[58] Field of Search .............. 219/494, 490, 495, 497, 219/492, 499, 501, 216, 508, 509; 323/235, 299; 367/117, 38–41

[56] References Cited

U.S. PATENT DOCUMENTS

| 4,233,498 | 11/1980 | Payne et al. | 219/490 |
| 4,340,807 | 7/1982 | Raskin et al. | 219/497 |
| 4,377,739 | 3/1983 | Eckert, Jr. et al. | 219/492 |
| 4,400,613 | 8/1983 | Popelish | 219/497 |
| 4,404,461 | 9/1983 | Sitek et al. | 219/494 |

Primary Examiner—M. H. Paschall
Attorney, Agent, or Firm—Michael P. Lynch; Thomas R. Trempus

[57] ABSTRACT

A microcomputer is programmed to respond to the zero crossings of an AC power source to trigger a uniform pulse pattern of an integral number of AC cycles as the AC excitation to a heater element to maintain the temperature of the heater element essentially constant.

3 Claims, 4 Drawing Figures

PULSE FREQUENCY MODULATION CONTROL FOR A HEATER

This application is a continuation of application Ser. No. 521,206, filed Aug. 8, 1983, now abandoned.

BACKGROUND OF THE INVENTION

The ion conductive characteristics of solid electrolyte materials have found widespread applications in industrial and process control environments for monitoring and controlling gas constituents. The operation of the conventional solid electrolyte electrochemical cell as a gas measuring device is generally operated in accordance with the Nernst equation wherein an EMF is generated in response to a change in the partial pressure of the gas constituent at elevated temperatures. A detailed description of the construction and operation of such an electrochemical cell for oxygen measurements is described in Reissue U.S. Pat. No. 28,792 which is assigned to the assignee of the present invention and incorporated herein by reference. Inasmuch as elevated temperatures are required to achieve optimum ion conduction, and temperature is a variable in the Nernst equation, it is generally recognized that in order to equate the gas measurement directly to the generated EMF, it is essential to maintain the temperature of the cell at a constant level.

There is described herein with reference to the accompanying drawings a preferred technique for controlling a heater element such as that associated with a solid electrolyte electrochemical cell employed for gas measurements.

SUMMARY OF THE INVENTION

In order to accurately control the temperature of the heating element, the AC power to the heater must be modulated to maintain the required temperature. Techniques typically employed to control the AC power to a heater include phase control and pulse width modulation. While phase control can be used to provide very accurate control, radio frequency interference can be generated by switching the AC power near the peak of the cycle. Furthermore, DC components are generated by phase control which cause saturation and overheating of the transformer typically associated with the heating element. By its nature, phase control does not easily lend itself to digital control techniques and thus cannot be readily implemented through the use of a microcomputer.

Pulse width modulation techniques are similar to on-off burst control where full power is supplied to the heater on a continuous basis for an integral number of AC cycles and then is switched off to produce the correct duty cycle to satisfy the temperature demand. This technique often produces excessive ripple in the process variable.

The inventive concept disclosed herein is a pulse frequency, or pulse duration, modulation technique which avoids the shortcomings described above and provides an integral number of AC cycles to the heater element via a uniform pulse pattern. Pulse duration, or pulse frequency, modulation techniques involving digital-to-analog converters are described in U.S. Pat. Nos. 3,603,977 and 3,754,233 which are assigned to the assignee of the present invention and incorporated herein by reference.

DESCRIPTION OF THE DRAWINGS

The invention will become more readily apparent from the following exemplary description in connection with the accompanying drawings.

DESCRIPTION OF THE PREFERRED EMBODIMENT

Figure 1:
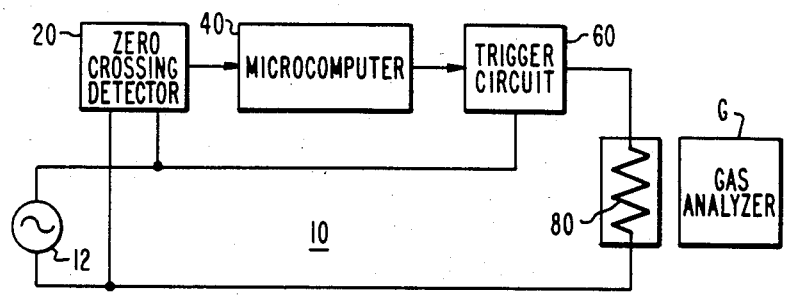
FIG. 1 is a schematic block diagram of an implementation of the invention.

Referring to FIG. 1 there is schematically illustrated in block diagram form a heater control circuit 10 comprising an AC power source 12, a zero crossing detector circuit 20, a microcomputer 40, a trigger circuit 60 and a heater element 80.

Figure 3:
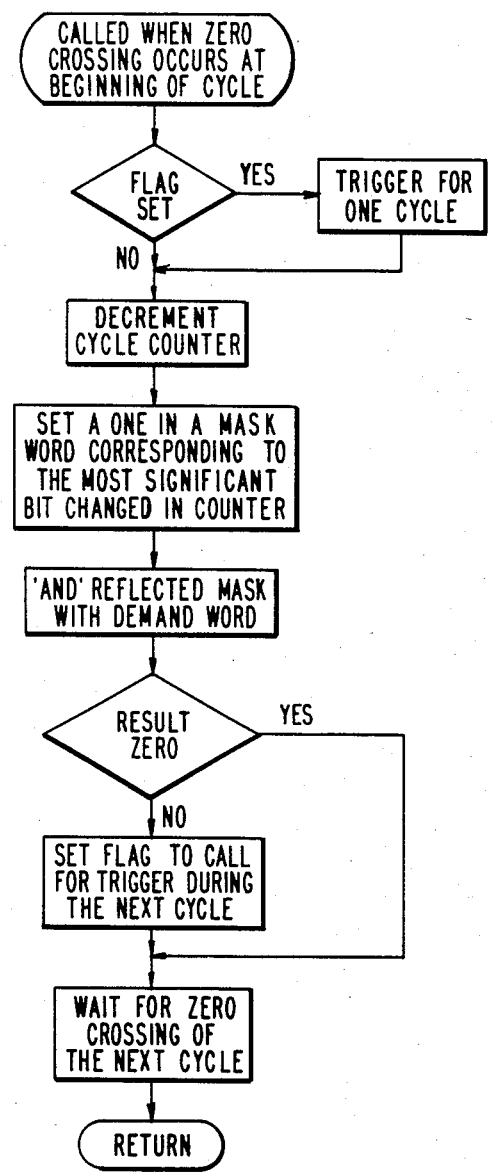
FIG. 3 is a flow diagram depicting the software routine employed by the microcomputer of FIG. 1 to control the application of AC power to the heater element.

The microcomputer 40, which consists of a commercially available microprocessor, such as the INTEL 8085A, and associated erasable programmable read-only memory (EPROM) and random access memory (RAM) respond to a software routine, which is illustrated in the flow chart of FIG. 3, by controlling the operation of the triggering circuit 60 to effect an application of a uniform pattern of an integer number of AC cycles to the heater element 80 to maintain a known operating temperature for the gas analyzer device G.

Figure 2:
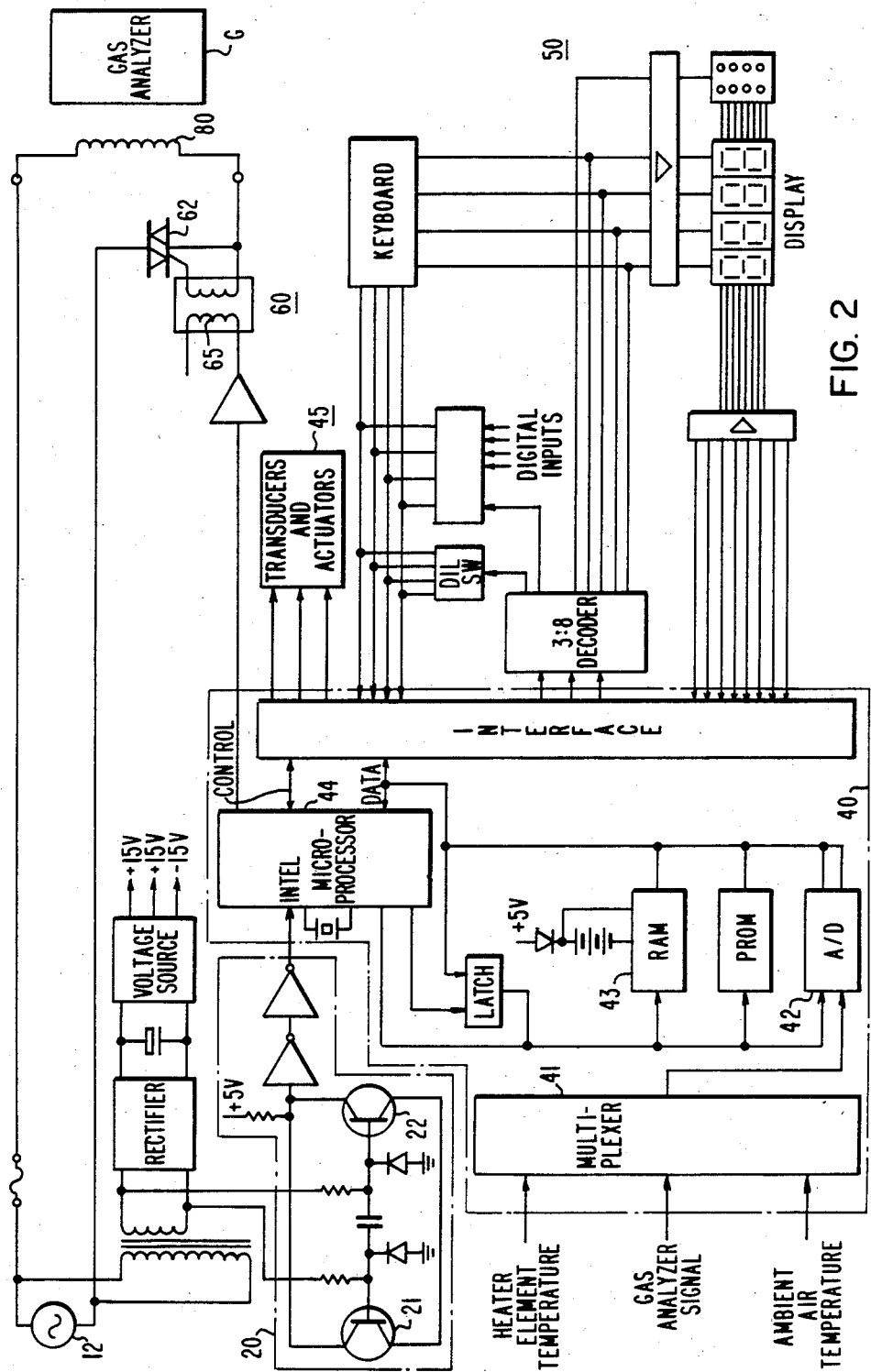
FIG. 2 is a detailed schematic embodiment of FIG. 1.

A demand word used by the pulse frequency modulation algorithm illustrated in the flow diagram of FIG. 3 is developed by a heater temperature control algorithm in the microcomputer 40 in response to input information provided to the microcomputer 40 as illustrated in the detailed schematic diagram of FIG. 2. This demand word may be updated any time during the modulation period.

The zero crossing detector circuit 20 is an important element in the heater control circuit 10 in that it functions to interrupt the microcomputer 40 at each rising, or falling, edge of the zero crossing of the AC power. A real time counter is implemented internally in the software of the microcomputer 40 and is preset with the number of cycles of the AC power to be controlled during the modulation period. The outputs of the zero crossing detector circuit 20 decrement the counter at the detection of each AC power cycle. The microcomputer 40 notes the most significant bit changed when the decrement occurs. A mask word is created which contains a single logic 1 at the corresponding reflected bit position. For example, if bit 0 of the internally programmed cycle counter is the most significant bit to change during the decrement operation, then the mask word will contain a logic 1 in its most significant bit position. By "ANDING" the mask word with the demand word, as illustrated in the flow diagram of FIG. 3, a decision is made as to whether or not to activate the trigger circuit 60 during the next cycle of the AC power. By interrupting the microcomputer 40 at each rising, or falling, edge of the zero crossing of the AC power, the software routine of the microcomputer 40 controls the heater element 80 by activating the trigger circuit 60 near the zero crossings of the AC power so that the power is dispatched to the heater element 80 in an improved pulse frequency modulation scheme consisting of an integral number of AC cycles. This technique results in the application of an integral number of power cycles being supplied uniformly over the sampling period, thereby resulting in a relatively low ripple content. The ripple content of the improved pulse frequency modulation scheme is at its lowest at 50% duty cycle and is a factor of $2^{(n-2)}$ less than the ripple produced by the conventional pulse width modulation technique, where n is the number of bit positions in the data word used for the demand signal.

Inasmuch as an integer number of AC cycles are dispatched to control the heater element 80 there is a relatively "soft" activation, or turn-on, of the triggering circuit 60, thereby minimizing grounding or radio frequency interference problems.

Figure 4A:
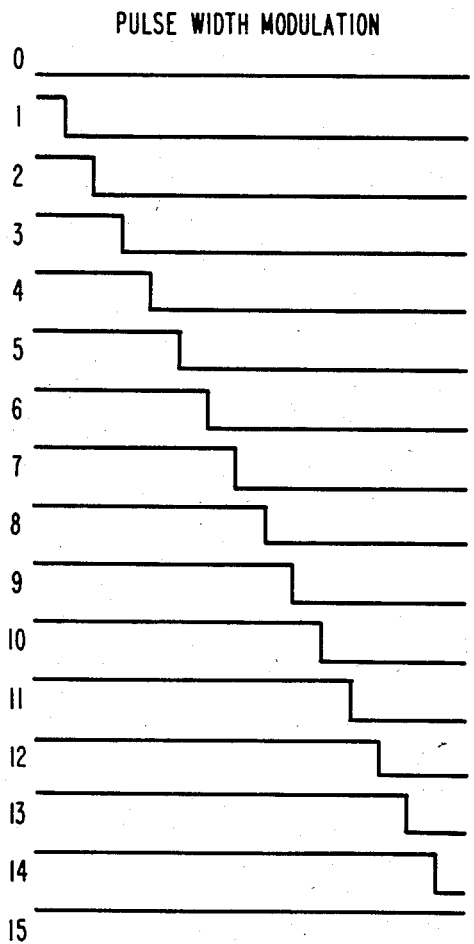
FIG. 4 is a comparative tabulation of conventional pulse width modulation and pulse frequency modulation in accordance with the invention.
Figure 4B:
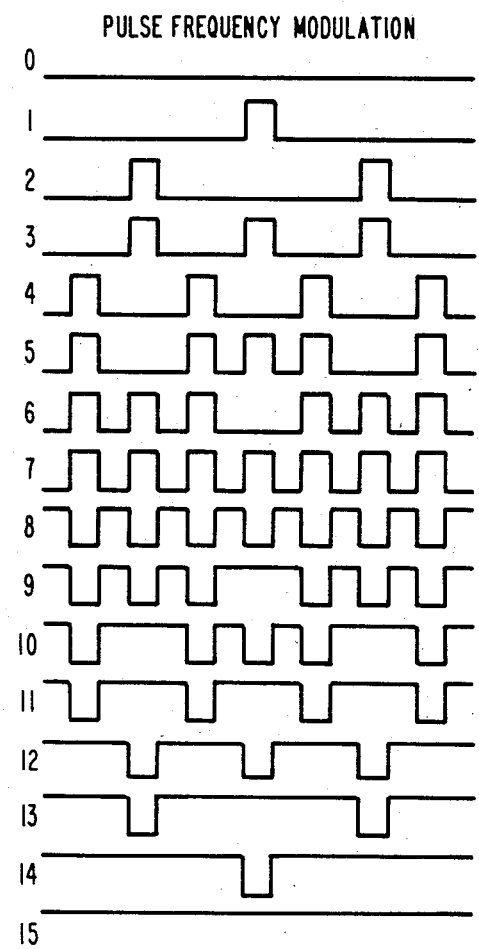

The waveform comparison tabulation of FIG. 4 compares the waveform of the conventional pulse width modulation technique with that of the disclosed improved pulse frequency modulation technique to illustrate the fact that the pulse frequency modulation technique develops a heater element pulse excitation pattern which is essentially uniform over the modulation period. The illustration of FIG. 4 shows the comparison between pulse width modulation and pulse frequency modulation for a 4-bit register wherein each pulse corresponds to a full AC power cycle.

A typical detailed schematic implementation of the heater control circuit 10 of FIG. 1 is schematically illustrated in FIG. 3. The microcomputer 40 is illustrated as including a multiplexer 41 (type AD7503) which supplies analog signals indicative of heater temperature, ambient temperature, gas analyzer signal etc. to an analog to digital converter 42 (type ICL7109). The output of the converter 42 is supplied as data to the microprocessor 44 (Intel 8085A). The demand word, mask word, flag and cycle counter are stored in the random access memory 43. A programmable peripheral interface chip 44, which is commercially available as an INTEL Type 8255, provides communication and interface between the microcomputer 40 and various external transducers and actuators 45, as well as an operator controlled keyboard and display 50 which can be used to update data in the microcomputer 40.

The zero crossing detection circuit 20 is typically illustrated as consisting of transistors 21 and 22 (type 2N2222A). When the AC voltage is less than 0.7 volts at the base of the transistors, the transistors are turned off and the output of the circuit 20 is high. When the AC voltage is greater than 0.7 volts at the base of the transistors are turned on and the output of the circuit 20 is low.

The trigger circuit 60 is schematically illustrated as consisting of a triac 62 arranged in a triac pulse firing circuit wherein the triac 62 is coupled to the output of the microcomputer 40 via an isolating pulse transformer 65.

I claim:

1. A heater control system for maintaining a predetermined temperature of a solid electrolyte electrochemical cell of a gas analyzer essentially constant, comprising:
    an AC power source;
    a heater element operatively coupled to said solid electrolyte electrochemical cell of said gas analyzer,
    a control circuit means coupling said AC power source to said heater element, said control circuit means including, a zero crossing detector circuit means for developing output logic levels indicative of the zero crossing of the AC cycles of said AC power source, a microcomputer means including a software program which implements a real time counter which is preset with the number of AC cycles to be controlled during a modulation period, the logic outputs of said zero crossing detector circuit means decrementing the counter, said microcomputer means including a multiplexer which generates signals indicative of at least said heater elements temperature, ambient temperature and gas analysis signal, said microcomputer means responding to the counter and the signals generated by said multiplexer in order to select the AC cycles within which AC power is applied to said heater element during the modulation period and generating a uniform output pulse pattern corresponding to an integral number of AC cycles to maintain the predetermined heater temperature essentially constant; and
    a trigger circuit means responsive to the output pulse pattern of said microcomputer means to dispatch uniformly the integral number of AC cycles of said AC power source to said heater element over the modulation period wherein the AC power applied to said heater element is characterized by a low ripple content and minimal radio frequency interference.

2. A heater control system as claimed in claim 1 wherein said trigger circuit means includes a triac pulse firing circuit and an isolating pulse transformer coupling said triac pulse firing circuit to said microcomputer means.

3. A heater control system as claimed in claim 1 further including;
    operator means for updating the data in said microcomputer means.

* * * * *